US011922854B2

(12) United States Patent
Kwon

(10) Patent No.: US 11,922,854 B2
(45) Date of Patent: Mar. 5, 2024

(54) TIMING CONTROLLER, DISPLAY DRIVING DEVICE INCLUDING THE SAME AND METHOD FOR DRIVING THE SAME

(71) Applicant: LX SEMICON CO., LTD., Daejeon (KR)

(72) Inventor: You Jin Kwon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 55 days.

(21) Appl. No.: 17/865,607

(22) Filed: Jul. 15, 2022

(65) Prior Publication Data

US 2023/0154378 A1 May 18, 2023

(30) Foreign Application Priority Data

Nov. 16, 2021 (KR) ........................ 10-2021-0157366

(51) Int. Cl.

| | |
|---|---|
| ***G09G 3/20*** | (2006.01) |
| *G09G 3/3208* | (2016.01) |
| *G09G 3/3275* | (2016.01) |
| *G09G 3/36* | (2006.01) |
| *G09G 5/00* | (2006.01) |

(52) U.S. Cl.

CPC ......... *G09G 3/2092* (2013.01); *G09G 3/3208* (2013.01); *G09G 3/3275* (2013.01); *G09G 3/36* (2013.01); *G09G 3/3688* (2013.01); *G09G 5/001* (2013.01); *G09G 2300/043* (2013.01); *G09G 2310/0243* (2013.01); *G09G 2310/08* (2013.01); *G09G 2320/02* (2013.01)

(58) Field of Classification Search

CPC .. G09G 3/2092; G09G 3/3208; G09G 3/3275; G09G 3/36; G09G 3/3688; G09G 5/001; G09G 2300/043; G09G 2310/0243; G09G 2310/08; G09G 2320/02

See application file for complete search history.

(56) References Cited

U.S. PATENT DOCUMENTS

| | | | | |
|---|---|---|---|---|
| 2011/0199368 A1* | 8/2011 | Huang | G09G 3/20 | 345/213 |
| 2012/0146965 A1* | 6/2012 | Baek | G09G 3/006 | 345/204 |
| 2014/0132575 A1* | 5/2014 | Yang | G09G 3/20 | 345/204 |
| 2014/0192097 A1* | 7/2014 | Baek | G09G 3/3688 | 345/87 |
| 2020/0135080 A1* | 4/2020 | Zhou | G09G 3/2096 | |

FOREIGN PATENT DOCUMENTS

| | | |
|---|---|---|
| KR | 10-2017-0044969 A | 4/2017 |
| KR | 10-2019-0077909 A | 7/2019 |

* cited by examiner

*Primary Examiner* — Adam J Snyder

(74) *Attorney, Agent, or Firm* — ROTHWELL, FIGG, ERNST & MANBECK, P.C.

(57) ABSTRACT

A timing controller suitable for receiving image data and a timing signal from a host system and outputting output data to a data driving circuit may include a scrambler configured to output scrambled image data by scrambling the image data; a pattern detection unit configured to calculate a first unbalanced pattern count as a count of unbalanced patterns included in the image data and a second unbalanced pattern count as a count of unbalanced patterns included in the scrambled image data; and an output data determination unit configured to determine output data by using the first unbalanced pattern count and the second unbalanced pattern count.

18 Claims, 10 Drawing Sheets

FIG. 9

| Classification | RGB | SRGB |
|---|---|---|
| CK | 1 | 1 |
| | 1 | 1 |
| Data | 0 | 1 |
| | 1 | 1 |
| | 1 | 1 |
| | 1 | 0 |
| | 0 | 1 |
| | 1 | 0 |
| | 0 | 1 |
| | 0 | 0 |
| | 0 | 1 |
| | 1 | 0 |
| | 1 | 1 |
| | 1 | 1 |
| | 1 | 0 |
| | 0 | 1 |
| | 1 | 0 |
| | 0 | 1 |
| | 1 | 1 |
| | 1 | 0 |
| | 0 | 0 |
| | 0 | 1 |
| Dummy | 0 | 0 |
| | 0 | 0 |
| decision | True | True |
| Count | 1 | 1 |
| | UP1 | UP2 |

| Classification | RGB | SRGB |
|---|---|---|
| CK | 1 | 1 |
| | 1 | 1 |
| Data | 0 | 1 |
| | 0 | 0 |
| | 1 | 1 |
| | 1 | 0 |
| | 1 | 1 |
| | 1 | 0 |
| | 0 | 1 |
| | 1 | 0 |
| | 0 | 1 |
| | 1 | 1 |
| | 0 | 1 |
| | 1 | 1 |
| | 0 | 1 |
| | 1 | 1 |
| | 1 | 0 |
| | 1 | 1 |
| | 0 | 1 |
| | 1 | 0 |
| | 0 | 1 |
| | 0 | 0 |
| Dummy | 0 | 0 |
| | 0 | 0 |
| decision | True | False |
| Count | 1 | 0 |
| | UP1 | UP2 |

| Classification | RGB | SRGB |
|---|---|---|
| CK | 1 | 1 |
| | 1 | 1 |
| Data | 0 | 1 |
| | 1 | 1 |
| | 0 | 1 |
| | 1 | 0 |
| | 0 | 1 |
| | 1 | 0 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| Dummy | 0 | 0 |
| | 0 | 0 |
| decision | False | True |
| Count | 0 | 1 |
| | UP1 | UP2 |

| Classification | RGB | SRGB |
|---|---|---|
| CK | 1 | 1 |
| | 1 | 1 |
| Data | 1 | 1 |
| | 0 | 1 |
| | 1 | 1 |
| | 0 | 1 |
| | 1 | 0 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| | 1 | 1 |
| | 0 | 1 |
| Dummy | 1 | 0 |
| | 0 | 0 |
| decision | False | False |
| Count | 0 | 0 |
| | UP1 | UP2 |

| Classification | RGB | SRGB |
|---|---|---|
| CK | 1 | 1 |
| | 1 | 1 |
| Data | 0 | 1 |
| | 1 | 1 |
| | 0 | 1 |
| | 1 | 0 |
| | 0 | 1 |
| | 1 | 0 |
| | 0 | 1 |
| | 0 | 0 |
| | 0 | 1 |
| | 1 | 1 |
| | 1 | 1 |
| | 1 | 1 |
| | 1 | 0 |
| | 0 | 1 |
| | 1 | 0 |
| | 0 | 1 |
| | 1 | 1 |
| | 1 | 0 |
| | 0 | 0 |
| | 1 | 0 |
| Dummy | 0 | 0 |
| | 0 | 0 |
| decision | True | True |
| Count | 1 | 2 |
| | UP1 | UP2 |

FIG. 10

| Packet No | RGB | SRGB | Packet No | RGB | SRGB | Packet No | RGB | SRGB | Packet No | RGB | SRGB |
|---|---|---|---|---|---|---|---|---|---|---|---|
| 1 | 1 | 0 | 1 | 0 | 1 | 1 | 0 | 0 | 1 | 0 | 0 |
| 2 | 2 | 2 | 2 | 2 | 2 | 2 | 0 | 1 | 2 | 0 | 1 |
| 3 | 2 | 2 | 3 | 2 | 2 | 3 | 1 | 1 | 3 | 1 | 1 |
| 4 | 2 | 2 | 4 | 2 | 2 | 4 | 2 | 1 | 4 | 2 | 1 |
| 5 | 0 | 0 | 5 | 0 | 0 | 5 | 0 | 0 | 5 | 1 | 0 |
| • • • | 0 | 0 | • • • | 0 | 0 | • • • | 0 | 0 | • • • | 0 | 0 |
| 476 | 1 | 1 | 476 | 1 | 1 | 476 | 0 | 1 | 476 | 0 | 1 |
| 477 | 2 | 2 | 477 | 2 | 2 | 477 | 1 | 1 | 477 | 1 | 1 |
| 478 | 2 | 2 | 478 | 2 | 2 | 478 | 0 | 1 | 478 | 1 | 1 |
| 479 | 1 | 1 | 479 | 1 | 1 | 479 | 0 | 0 | 479 | 2 | 0 |
| 480 | 0 | 0 | 480 | 0 | 0 | 480 | 0 | 0 | 480 | 0 | 0 |
| total count of unbalanced pattern | 13 | 12 | total count of unbalanced pattern | 12 | 13 | total count of unbalanced pattern | 4 | 6 | total count of unbalanced pattern | 8 | 6 |
| limiter 10 count consider | blocking | blocking | limiter 10 count consider | blocking | blocking | limiter 10 count consider | Output | Output | limiter 10 count consider | Output | Output |
| unbalanced pattern consider | blocking | Output | unbalanced pattern consider | Output | blocking | unbalanced pattern consider | Output | blocking | unbalanced pattern consider | blocking | Output |
| Final output | blocking | Output | Final output | blocking | Output | Final output | Output | blocking | Final output | blocking | Output |

TIMING CONTROLLER, DISPLAY DRIVING DEVICE INCLUDING THE SAME AND METHOD FOR DRIVING THE SAME

CROSS-REFERENCE TO RELATED APPLICATIONS

This application claims the benefit of the Korean Patent Applications 10-2021-0157366 filed on Nov. 16, 2021, which are hereby incorporated by reference as if fully set forth herein.

FIELD OF THE INVENTION

Various embodiments generally relate to a timing controller, a display driving device including the same and a method for driving the same.

BACKGROUND

Representative examples of a display device for displaying an image include a liquid crystal display (LCD) using liquid crystal and an organic light emitting diode (OLED) display using organic light emitting diodes.

In order to drive such a display, image data is transmitted to a data driving circuit by using a timing signal inputted from an external host system. The data driving circuit may receive the image data, transmit the image data to each pixel of a display panel, and accordingly, output an image to the display panel. In this case, as the pixels of the display panel receive image data distorted in the process of being transmitted, the quality of the image outputted to the display panel may be degraded.

SUMMARY

Various embodiments are directed to a timing controller which minimizes signal distortion occurring in the process of transmitting a signal for driving a display panel, a display driving device including the same and a method for driving the same.

In an embodiment, a timing controller suitable for receiving image data and a timing signal from a host system and outputting output data to a data driving circuit may include: a scrambler configured to output scrambled image data by scrambling the image data; a pattern detection unit configured to calculate a first unbalanced pattern count as a count of unbalanced patterns included in the image data and a second unbalanced pattern count as a count of unbalanced patterns included in the scrambled image data; and an output data determination unit configured to determine output data by using the first unbalanced pattern count and the second unbalanced pattern count.

The timing controller according to the embodiment of the present disclosure may transmit data with minimal signal distortion by calculating the counts of unbalanced patterns included in image data and scrambled image data and having high signal distortion frequencies.

In addition, since the distortion of a signal provided to a display panel is minimized, the timing controller according to the embodiment of the present disclosure may prevent the degradation of image quality.

BRIEF DESCRIPTION OF THE DRAWINGS

FIG. 9 is a diagram illustrating a pattern detection method in accordance with an embodiment of the present disclosure.

FIG. 10 is a diagram illustrating a method for calculating the total count of the first unbalanced pattern counts and the total count of the second unbalanced pattern counts for each frame data and determining whether to perform dynamic scramble.

DETAILED DESCRIPTION

Figure 1:
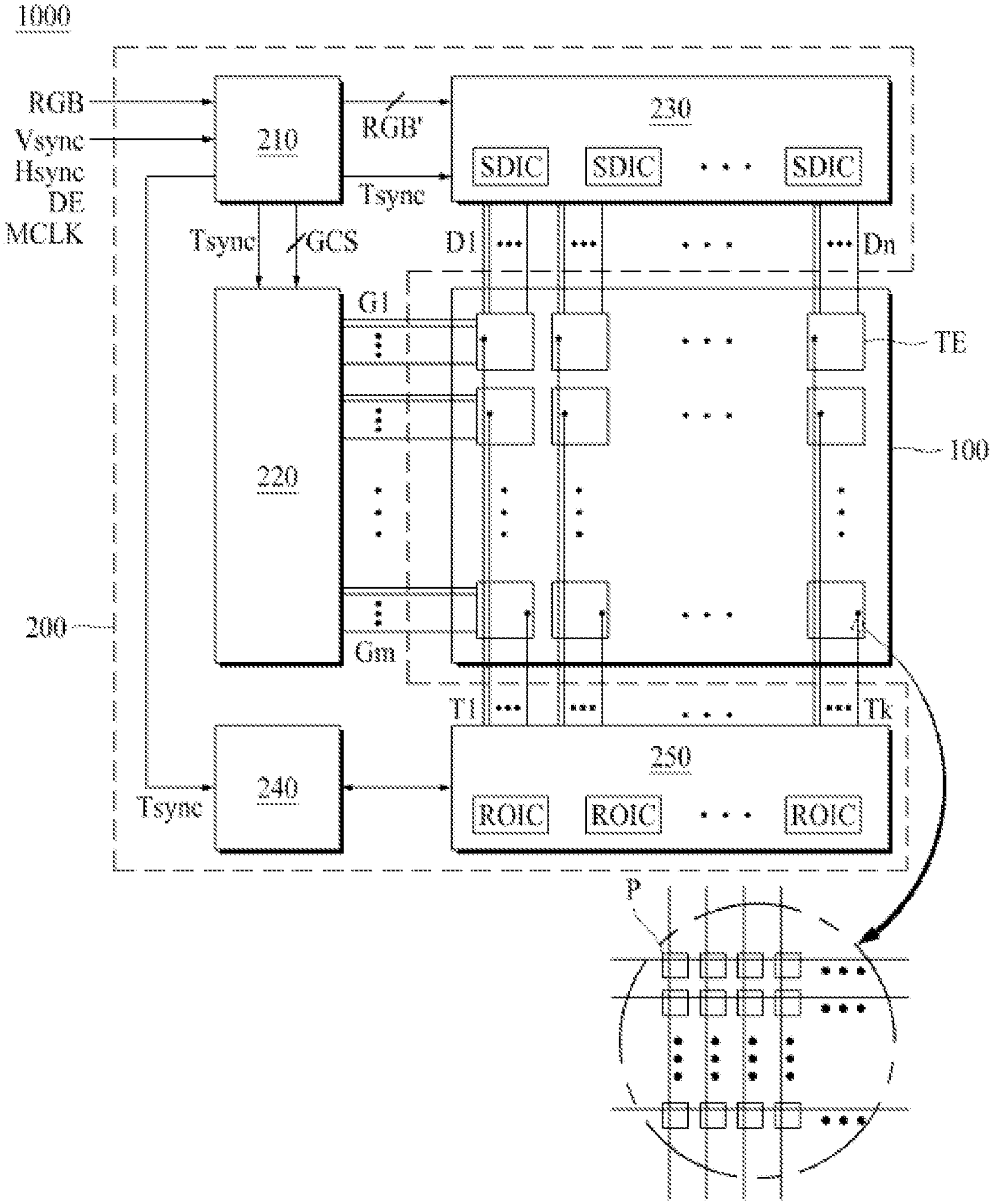
FIG. 1 is a system configuration diagram of a touch display device in accordance with an embodiment of the present disclosure.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where ‘comprise’, ‘have’, and ‘include’ described in the present specification are used, another part may be added unless ‘only-’ is used. The terms of a singular form may include plural forms unless referred to the contrary.

In construing an element, the element is construed as including an error range although there is no explicit description.

In describing a time relationship, for example, when the temporal order is described as 'after-', 'subsequent-', 'next-', and 'before-', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a timing controller, a display driving device and a signal transmitted between the timing controller and a data driving circuit in accordance with embodiments of the present disclosure will be described in detail with reference to FIGS. 1 to 7.

Figure 2:
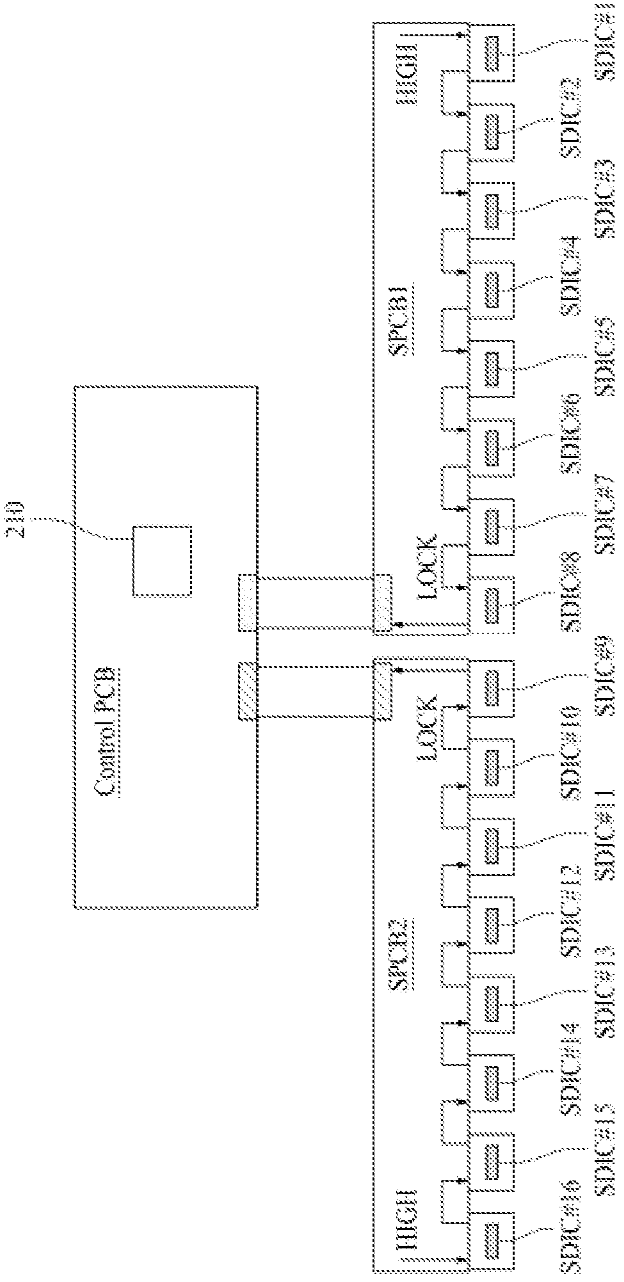
FIG. 2 is a diagram illustrating a connection relationship between a timing controller and a data driving circuit in accordance with the embodiment of the present disclosure.
Figure 3:
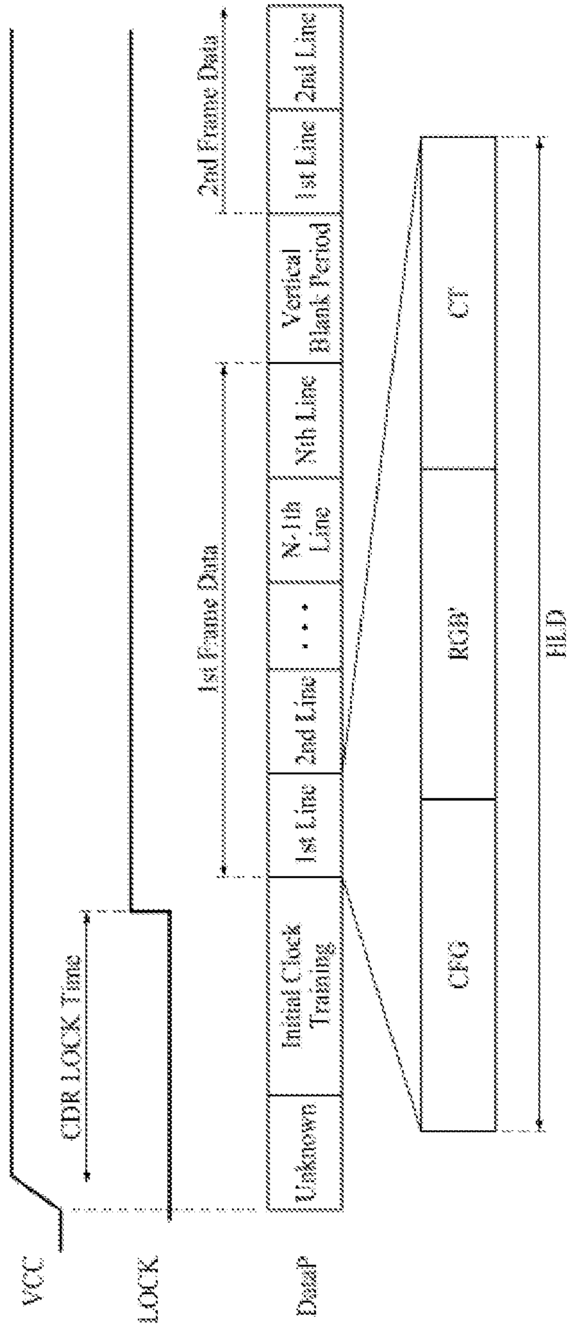
FIG. 3 is a diagram illustrating the format of a signal transmitted from the timing controller to the data driving circuit in accordance with the embodiment of the present disclosure.
Figure 4:
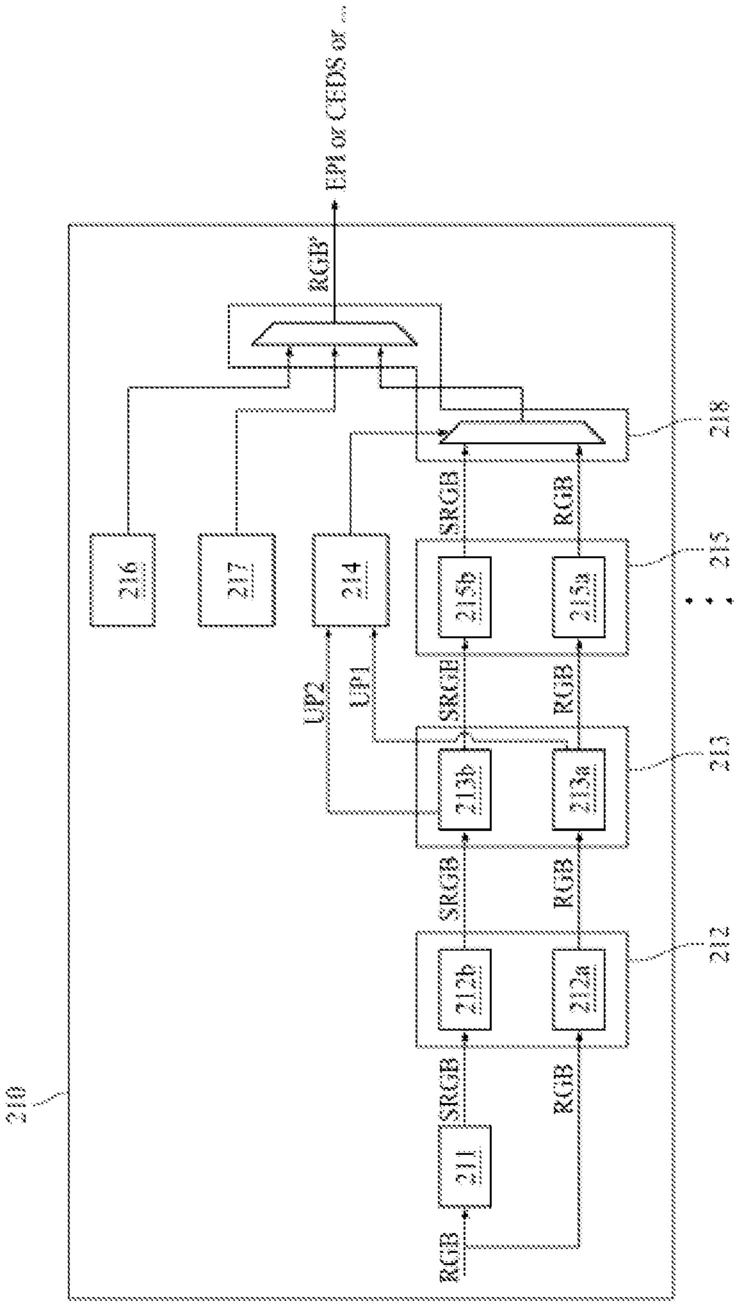
FIG. 4 is a configuration diagram of the timing controller in accordance with the embodiment of the present disclosure.
Figure 5:
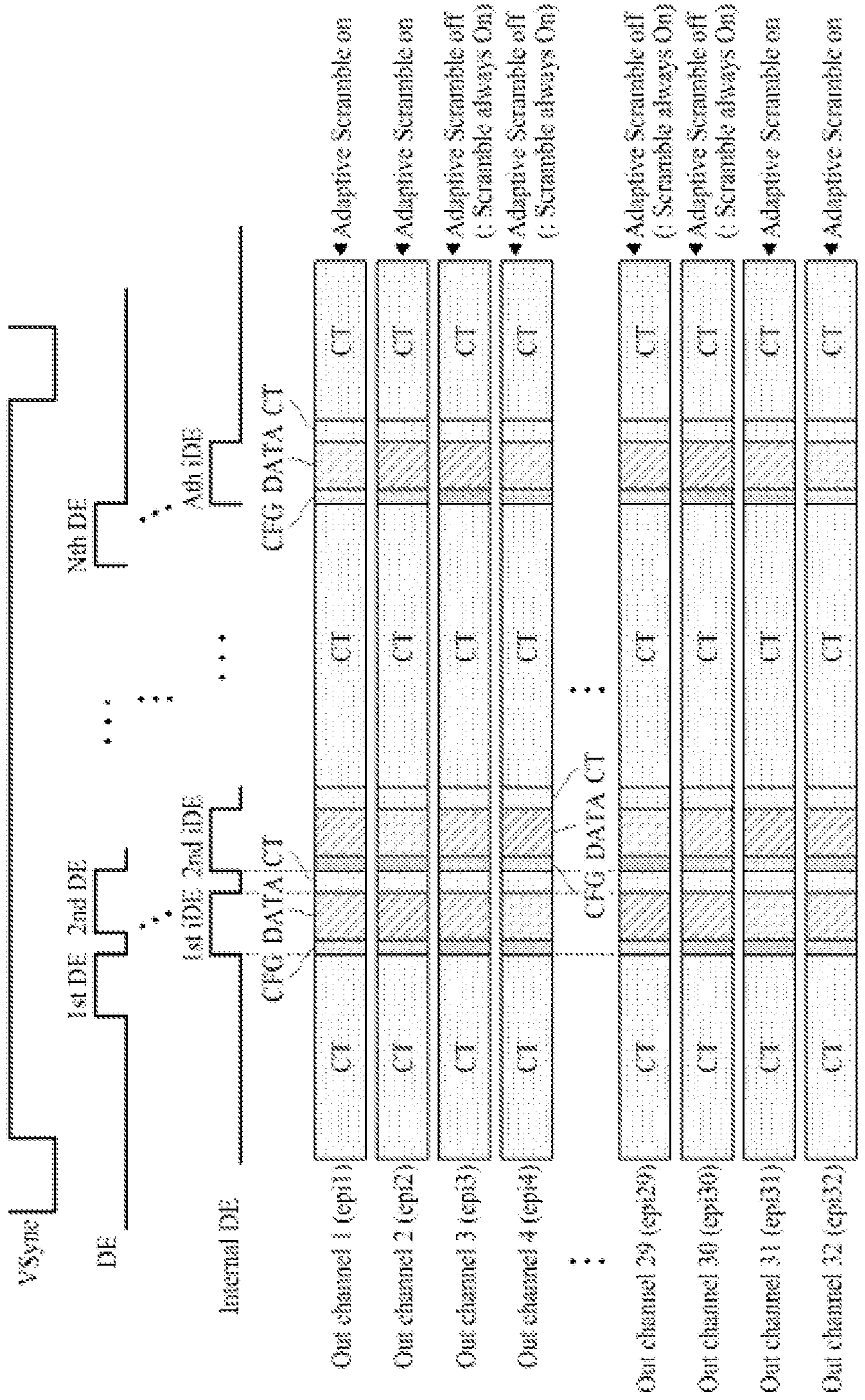
FIG. 5 is a diagram illustrating signals transmitted through channels which connect the timing controller and the data driving circuit in accordance with the embodiment of the present disclosure.
Figure 6:
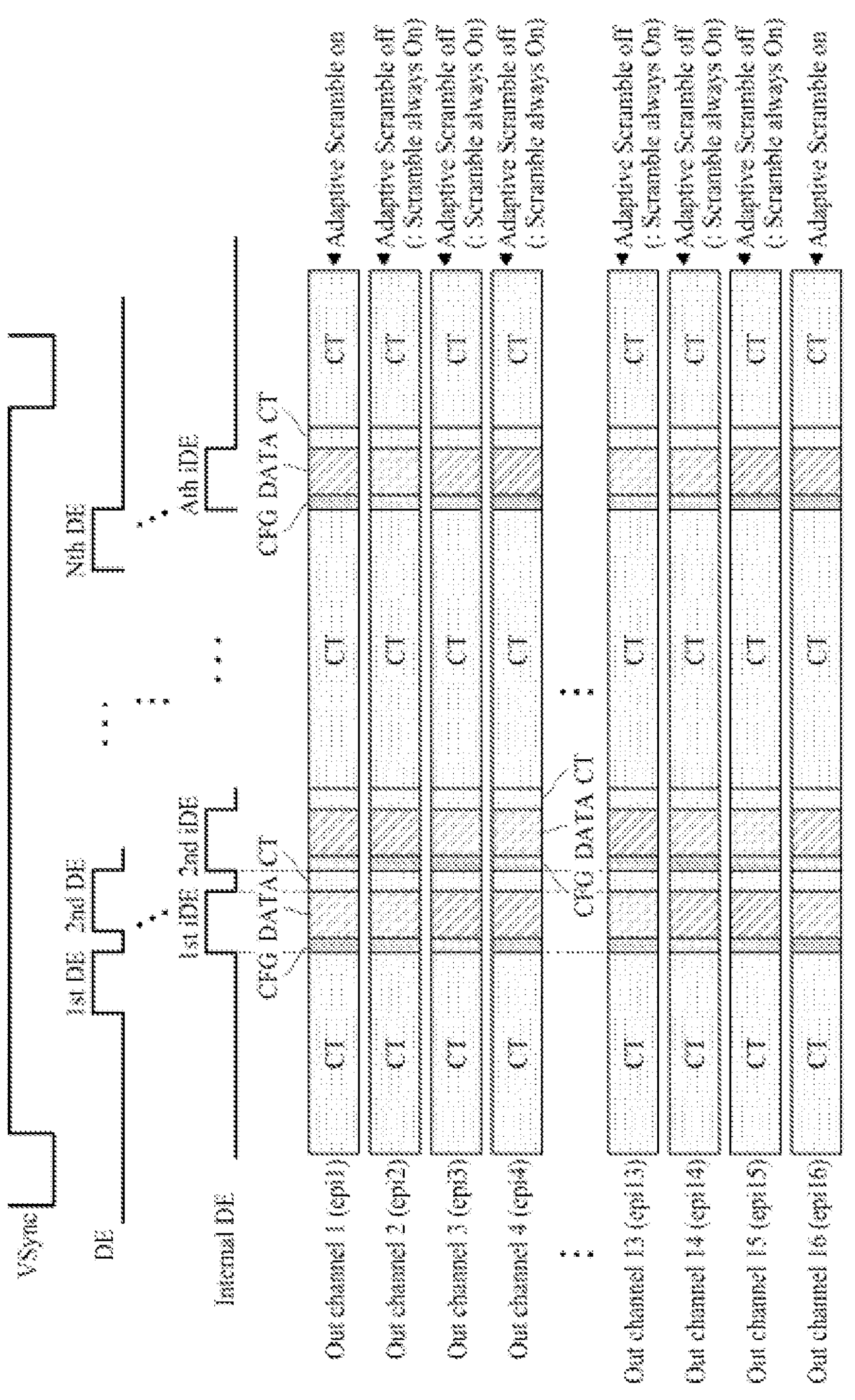
FIG. 6 is a diagram illustrating signals transmitted through channels which connect the timing controller and the data driving circuit in accordance with another embodiment of the present disclosure.
Figure 7:
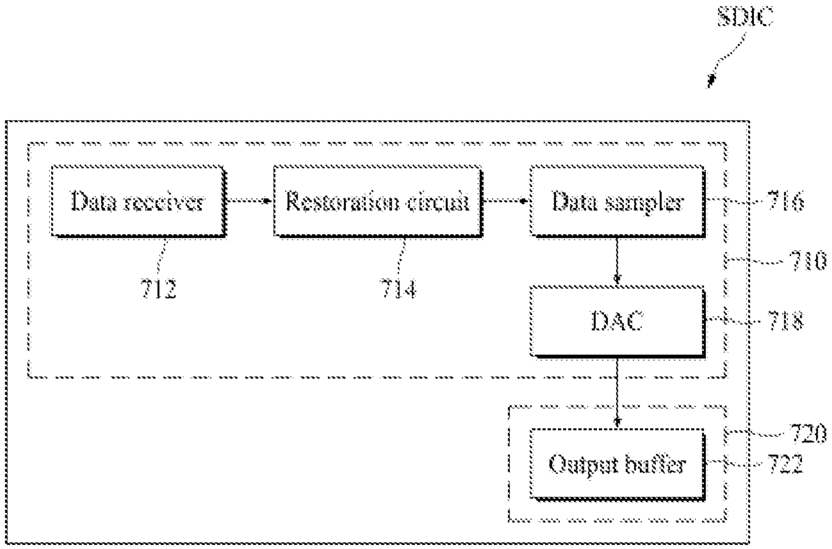
FIG. 7 is a configuration diagram of the data driving circuit in accordance with the embodiment of the present disclosure.

FIG. 1 is a system configuration diagram of a touch display device in accordance with an embodiment of the present disclosure, and FIG. 2 is a diagram illustrating a connection relationship between a timing controller and a data driving circuit in accordance with the embodiment of the present disclosure. FIG. 3 is a diagram illustrating the format of a signal transmitted from the timing controller to the data driving circuit in accordance with the embodiment of the present disclosure. FIG. 4 is a configuration diagram of the timing controller in accordance with the embodiment of the present disclosure. FIG. 5 is a diagram illustrating signals transmitted through channels which connect the timing controller and the data driving circuit in accordance with the embodiment of the present disclosure, and FIG. 6 is a diagram illustrating signals transmitted through channels which connect the timing controller and the data driving circuit in accordance with another embodiment of the present disclosure. FIG. 7 is a configuration diagram of the data driving circuit in accordance with the embodiment of the present disclosure.

The touch display device 1000 in accordance with the embodiment which performs a display function and a touch sensing function may be implemented as a flat panel display device such as a liquid crystal display (LCD) device or an organic light emitting diode (OLED) display device.

The touch display device 1000 may include a capacitance type touch screen for sensing a touch by a contact of a conductive object such as a finger or an active pen. Such a touch screen may be configured in a form independent of a display panel for implementing a display, or may be configured in a form in which touch sensors (or touch electrodes) are built in a pixel array of the display panel.

As illustrated in FIG. 1, the touch display device 1000 includes a display panel 100 and a touch display driving device 200 which drives the display panel 100.

The display panel 100 may display an image of a predetermined grayscale or receive a touch by a finger or an active pen. In an embodiment, the display panel 100 may be a display panel which has an in-cell touch type structure using a capacitance type. According to such an embodiment, the display panel 100 may be an in-cell touch type display panel using a self capacitance type or an in-cell touch type display panel using a mutual capacitance type. Hereinafter, for the sake of convenience in explanation, description will be made on the assumption that the display panel 100 is an in-cell touch type display panel using a self capacitance type.

The display panel 100 operates in a display mode and a touch sensing mode. The display panel 100 may display an image using light emitted from a backlight unit (not illustrated) by operating in the display mode during a display period, and may serve as a touch panel for sensing a touch by operating in the touch sensing mode during a touch sensing period.

The display mode may be performed during a display period set within one frame or each of a plurality of display periods set within one frame. The touch sensing mode may be performed during a touch sensing period TP set within one frame or each of a plurality of touch sensing periods TP1 to TPm set between the plurality of display periods within one frame. In order to realize a high resolution, the length of the display period may be set to be longer than the length of the touch sensing period TP within one frame, or the number of the display periods may be set to be greater than the number of the touch sensing periods TP1 to TPm within one frame.

The display panel 100 includes a plurality of data lines D1 to Dn, a plurality of gate lines G1 to Gm, a plurality of pixels P, a plurality of touch sensors TE, and a plurality of touch lines T1 to Tk.

Each of the plurality of data lines D1 to Dn receives a data signal during the display mode. Each of the plurality of gate lines G1 to Gm receives a scan pulse during the display mode. The plurality of data lines D1 to Dn and the plurality of gate lines G1 to Gm are defined on a substrate to intersect with each other, and thereby, define a plurality of pixel regions. Each of the plurality of pixels P may include a thin film transistor (not illustrated) which is connected to a gate line and a data line adjacent thereto, a pixel electrode (not illustrated) which is connected to the thin film transistor, and a storage capacitor (not illustrated) which is connected to the pixel electrode.

Each of the plurality of touch sensors TE serves as a touch electrode which senses a touch by a finger or an active pen, or serves as a common electrode which drives liquid crystal by forming an electric field together with a pixel electrode. That is to say, each of the plurality of touch sensors TE is used as a touch electrode in the touch sensing mode, and is used as a common electrode in the display mode. Since each of the plurality of touch sensors TE is also used as a common electrode for driving liquid crystal, it may include a transparent conductive material.

Since each of the plurality of touch sensors TE is used as a self capacitance type touch sensor in the touch sensing mode, it should have a size larger than the minimum contact size between a touch object and the display panel 100. Accordingly, each of the plurality of touch sensors TE may have a size corresponding to at least one pixel P. In an embodiment, the plurality of touch sensors TE may be disposed at regular intervals along a plurality of horizontal lines and a plurality of vertical lines.

Each of the plurality of touch lines T1 to Tk is individually connected to each of the plurality of touch sensors TE. Each of the plurality of touch lines T1 to Tk supplies a common voltage Vcom to a corresponding touch sensor TE during a display period during one frame period or during a display period.

The touch display driving device 200 supplies a data signal to the plurality of pixels P, included in the display panel 100, during the display period to display an image through the display panel 100, and senses a touch through the touch sensors TE during the touch sensing periods TP1 to TPm (hereinafter, referred to as the touch sensing period TP).

To this end, the touch display driving device 200 may include a timing controller 210, a gate driving circuit 220, a data driving circuit 230, a touch controller 240 and a touch driving circuit 250.

In order to control the operation timing of a source drive IC SDIC by using a timing signal inputted from an external host system (not illustrated), the timing controller 210 encodes control data CFG and transmits the encoded control data CFG to the source drive IC SDIC through a channel which connects the timing controller 210 and the data driving circuit 230. In an embodiment, the timing signal may include at least one of a vertical synchronization signal Vsync, a horizontal synchronization signal Hsync, a data enable signal DE and a main clock MCLK.

As illustrated in FIG. 2, the timing controller 210 is positioned on a control PCB. The timing controller 210 may be connected to source drive ICs SDIC #1 to SDIC #16 through cables and a source PCB (SPCB).

In order to control the operation timing of the source drive IC SDIC, the timing controller 210 may transmit a timing control signal including at least one of a polarity control signal (POL), a source start pulse (SSP), a source sampling clock (SSC) and a source output enable signal (SOE). In order to control the operation timing of the gate driving circuit 220 by using a timing signal inputted from the host system, the timing controller 210 may transmit a timing control signal including at least one of a gate start pulse (GSP), a gate shift clock (GSC) and a gate output enable signal (GOE). The timing controller 210 receives image data RGB from an external system, converts the image data RGB into output data RGB' in a form that may be processed by the data driving circuit 230, and outputs the output data RGB'.

The timing controller 210 may generate an internal data enable signal iDE by compressing an external data enable signal, transmitted from the host system, within a preset display period. The timing controller 210 may generate a touch synchronization signal Tsync which divides one frame period into the display period and the touch sensing period TP in conformity with the timing of the vertical synchronization signal Vsync and the internal data enable signal iDE. The timing controller 210 may transmit the touch synchronization signal Tsync to the gate driving circuit 220, the data driving circuit 230, the touch controller 240 and the touch driving circuit 250.

When the internal data enable signal iDE starts to be generated, the timing controller 210 generates a data packet in a form in which a clock is embedded between data, and transmits the data packet to the source drive IC SDIC. In detail, as illustrated in FIGS. 2 and 3, the timing controller 210 may transmit a lock signal LOCK for clock synchronization and a data packet DataP according to an interface protocol, to the source drive IC SDIC during the display period. When the lock signal LOCK having a high level is received from a last source drive IC SDIC among source drive ICs SDIC, as illustrated in FIG. 3, the timing controller 210 may transmit the data packet DataP to the source drive IC SDIC in the order of the control data CFG, the output data RGB' and clock training data CT which configure each horizontal line data HLD of a frame. For example, as illustrated in FIG. 2, during the display period, the timing controller 210 may transmit a high-level lock signal HIGH to the first source drive IC SDIC #1 and the sixteenth source drive IC SDIC #16 for clock synchronization and transmit the data packet DataP according to the interface protocol to the first to sixteenth source drive ICs SDIC #1 to SDIC #16. The high-level lock signal HIGH transmitted to the first source drive IC SDIC #1 and the sixteenth source drive IC SDIC #16 may be transmitted to adjacent source drive ICs in a cascade manner. Accordingly, the high-level lock signal HIGH transmitted to the first source drive IC SDIC #1 may be transmitted to the eighth source drive IC SDIC #8 through the second to seventh source drive ICs SDIC #2 to SDIC #7, and the high-level lock signal HIGH transmitted to the sixteenth source drive IC SDIC #16 may be transmitted to the ninth source drive IC SDIC #9 through the fifteenth to tenth source drive ICs SDIC #15 to SDIC #10. Accordingly, when the high-level lock signal HIGH is received by the eighth source drive IC SDIC #8 and the ninth source drive IC SDIC #9, as illustrated in FIG. 3, the timing controller 210 may transmit the data packet DataP to the source drive IC SDIC in the order of the control data CFG, the output data RGB' and the clock training data CT which configure each horizontal line data HLD of a frame.

As shown in FIG. 3, the lock signal LOCK is inverted to a high level after a lock stabilization time CDR LOCK Time, as a time from after data starts to be transmitted to the source drive IC SDIC as a driving voltage VCC is applied to the data driving circuit 230 to till the outputs of restoration circuits of the source drive ICs SDIC are stably fixed, elapses. On the other hand, if the lock signal LOCK having a low level is received from a last source drive IC SDIC #i, the timing controller 210 may transmit the clock training data CT again to the source drive IC SDIC to resume the clock training of the source drive IC SDIC.

The timing controller 210 in accordance with the embodiment of the present disclosure may transmit the data packet DataP including the output data RGB', generated through a dynamic scramble mode, to the data driving circuit 230. In detail, the dynamic scramble mode is a mode in which the count of unbalanced patterns, as signals having high signal distortion frequencies, is calculated in each of the image data RGB and scrambled image data SRGB, and according to a first unbalanced pattern count UP1 as the count of unbalanced patterns included in the image data RGB and a second unbalanced pattern count UP2 as the count of unbalanced patterns included in the scrambled image data SRGB, at least one of the image data RGB and the scrambled image data SRGB obtained by scrambling (randomizing) the image data RGB is determined as the output data RGB'. The timing controller 210 may transmit the data packet DataP including the output data RGB', generated according to the dynamic scramble mode, to at least one source drive IC SDIC of the data driving circuit 230. Therefore, the timing controller 210 may transmit data capable of minimizing signal distortion, between the image data RGB and the scrambled image data SRGB, by using the first unbalanced pattern count UP1 and the second unbalanced pattern count UP2.

According to the embodiment of the present disclosure, the timing controller 210 may transmit data to the data driving circuit 230 by using an embedded clock point-point interface (EPI) scheme or a clock embedded data signaling (CEDS) scheme. The data transmitted in the EPI scheme or the CEDS scheme may be configured in a format in which a clock signal is embedded in data. In detail, as shown in FIG. 3, when the driving voltage VCC is supplied to the timing controller 210 and the source drive IC SDIC, the timing controller 210 transmits the output data RGB' to the source drive IC SDIC in the form of the data packet DataP. The data packet DataP may be configured by initial clock training data ICT, data for each frame (Frame Data) and vertical blank data (Vertical Blank Period). Each of a plurality of horizontal line data HLD configuring each frame data (nth Frame Data) may be configured by the control data CFG, the output data RGB' including any one of stream type image data RGB and stream type scrambled image data SRGB and the clock training data CT. In detail, as shown in FIG. 3, each of the source drive ICs SDIC #1 to SDIC #i receives data including the initial clock training data ICT for the restoration of a clock, and then, when the restoration of a clock is completed, sequentially receives the control data CFG and the output data RGB' including any one of the image data RGB and the scrambled image data SRGB.

According to an embodiment of the present disclosure, as illustrated in FIG. 4, the timing controller 210 may include a scrambler 211, a pattern detection unit 213, an output data determination unit 214, a buffer unit 215, a clock training data generation unit 216, a control data generation unit 217 and a data output unit 218.

The scrambler 211 scrambles (randomizes) the image data RGB inputted to the timing controller 210, and converts the image data RGB into the scrambled image data SRGB.

As illustrated in FIG. 4, clock data CK and dummy data Dummy may be added to each of the image data RGB and the scrambled image data SRGB by a clock and dummy addition unit 212. For example, the clock data CK may be added before the image data RGB or the scrambled image data SRGB, and the dummy data Dummy may be added after the image data RGB or the scrambled image data SRGB. To this end, the clock and dummy addition unit 212 may include a first clock and dummy addition unit 212*a* which adds the clock data CK and the dummy data Dummy to the image data RGB and a second clock and dummy addition unit 212*b* which adds the clock data CK and the dummy data Dummy to the scrambled image data SRGB.

When the dynamic scramble mode is set, the pattern detection unit 213 may be driven to determine any one of the image data RGB and the scrambled image data SRGB as the output data RGB' by using the calculated first and second unbalanced pattern counts UP1 and UP2. In detail, the pattern detection unit 213 calculates the first unbalanced pattern count UP1 being the count of unbalanced patterns included in the image data RGB and the second unbalanced pattern count UP2 being the count of unbalanced patterns included in the scrambled image data SRGB. To this end, the pattern detection unit 213 includes a first pattern detection unit 213*a* which calculates the first unbalanced pattern count UP1 being the count of unbalanced patterns of the image data RGB and a second pattern detection unit 213*b* which calculates the second unbalanced pattern count UP2 being the count of unbalanced patterns of the scrambled image data SRGB. An unbalanced pattern may include a signal pattern with a high signal distortion occurrence frequency such as a signal pattern in which the same value is continued and is then inverted and re-inverted, as in "1111010." A process of calculating the first and second unbalanced pattern counts UP1 and UP2 will be described later in detail with reference to FIGS. 7 and 8.

On the other hand, when the dynamic scramble mode is not set, in order to constantly transmit the image data RGB or the scrambled image data SRGB regardless of the calculated first and second unbalanced pattern counts UP1 and UP2, the pattern detection unit 213 may not be driven. However, the embodiment of the present disclosure is not limited thereto, and the pattern detection unit 213 may be driven regardless of whether the dynamic scramble mode is set.

When the dynamic scramble mode is set, the output data determination unit 214 determines the output data RGB' to be outputted to the data driving circuit 230 by using the first and second unbalanced pattern counts UP1 and UP2 calculated from the pattern detection unit 213. In other words, the output data determination unit 214 receives the first and second unbalanced pattern counts UP1 and UP2 from the pattern detection unit 213, and determines the output data RGB' by using the received first and second unbalanced pattern counts UP1 and UP2. In detail, the output data determination unit 214 compares each of the total count of the first unbalanced pattern counts UP1 for one frame and the total count of the second unbalanced pattern counts UP2 for one frame with a limiter count. When the total count of the first unbalanced pattern counts UP1 for one frame is greater than the limiter count and the total count of the second unbalanced pattern counts UP2 for one frame is greater than the limiter count, the output data determination unit 214 determines one of the image data RGB and the scrambled image data SRGB as the output data RGB'. On the other hand, when the total count of the first unbalanced pattern counts UP1 is less than or equal to the limiter count or when the total count of the second unbalanced pattern counts UP2 is less than or equal to the limiter count, the output data determination unit 214 determines data having a smaller unbalanced pattern count between the image data RGB and the scrambled image data SRGB, as the output data RGB', by comparing the total count of the first unbalanced pattern counts UP1 and the total count of the second unbalanced pattern counts UP2. Namely, when the total count of the first unbalanced pattern counts UP1 is smaller than the total count of the second unbalanced pattern counts UP2, the output data determination unit 214 may determine the image data RGB as the output data RGB', and when the total count of the second unbalanced pattern counts UP2 is smaller than the total count of the first unbalanced pattern counts UP1, the output data determination unit 214 may determine the scrambled image data SRGB as the output data RGB'. To this end, the output data determination unit 214 may include a limiter and a comparator.

A method for the output data determination unit 214 to determine the output data RGB' to be outputted to the data driving circuit 230 by using the first and second unbalanced pattern counts UP1 and UP2 will be described later in more detail with reference to FIGS. 7 and 9.

When the dynamic scramble mode is not set, the output data determination unit 214 may constantly determine one of the image data RGB and the scrambled image data SRGB as the output data RGB' regardless of the first and second unbalanced pattern counts UP1 and UP2.

The buffer unit 215 stores the image data RGB, converts the stored image data RGB into a stream type and outputs the stream type image data RGB, and stores the scrambled image data SRGB, converts the stored scrambled image data SRGB into a stream type and outputs the stream type scrambled image data SRGB. To this end, the buffer unit 215 includes a first line buffer unit 215*a* which stores the image data RGB and outputs the stored image data RGB in the form of a stream and a second line buffer unit 215*b* which stores the scrambled image data SRGB and outputs the stored scrambled image data SRGB in the form of a stream.

As described above, the timing controller 210 according to the embodiment of the present disclosure may transmit a data packet to the data driving circuit 230 by using an embedded clock point-point interface (EPI) scheme or a clock embedded data signaling (CEDS) scheme. The data packet transmitted in the EPI scheme or the CEDS scheme is configured in a format in which clock data is embedded.

The clock training data generation unit 216 generates data indicating a clock training state. For example, the clock training data generation unit 216 may generate a clock pattern or the clock training data CT to be transmitted during an initial clock training period.

The control data generation unit 217 generates the control data CFG being data for the data driving circuit 230 to drive a data signal.

The data output unit 218 transmits the data packet DataP configured by the control data CFG, the output data RGB' and the clock training data CT to the source drive IC SDIC. In detail, the data output unit 218 outputs, to the source drive IC SDIC, the data packet DataP configured by the control data CFG received from the control data generation unit 217, the output data RGB' outputted from the buffer unit 215 by a signal for the output data RGB', outputted from the output data determination unit 214, and the clock training data CT inputted from the clock training data generation unit 216. As described above, the data output unit 218 outputs the control data CFG, the output data RGB' and the clock training data CT in synchronization with the internal data enable signal iDE generated using the vertical synchronization signal Vsync and the data enable signal DE. In detail, as shown in FIG. 3, when the internal data enable signal iDE is at a high level, the timing controller 210 transmits the control data CFG and the output data RGB' determined between the image data RGB and the scrambled image data SRGB to the respective channels between the timing controller 210 and the source drive IC SDIC, and when the internal data enable signal iDE is at a low level, the timing controller 210 transmits the clock training data CT.

According to an embodiment of the present disclosure, as shown in FIGS. 5 and 6, the timing controller 210 transmits the data packet DataP, generated through the dynamic scramble mode, to at least one source drive IC SDIC. For example, the timing controller 210 may be connected to one source drive IC SDIC through two channels, and thus, may be connected to 16 source drive ICs SDIC through total 32 channels. The timing controller 210 in accordance with the embodiment of the present disclosure may transmit the data packet DataP, generated through the dynamic scramble mode, to at least one source drive IC SDIC. In detail, the timing controller 210 may transmit the data packet DataP, generated through the dynamic scramble mode, to the source drive IC SDIC through at least one channel.

A signal transmitted from the timing controller 210 to the source drive IC SDIC may have a different distortion degree depending on the position of a pixel connected to each source drive IC SDIC. In detail, a signal inputted from the timing controller 210 to the source drive IC SDIC connected to each of pixels positioned at both ends of the display panel 100 may be increased in distortion compared to a signal inputted from the timing controller 210 to the source drive IC SDIC connected to a pixel positioned at the center of the display panel 100. In order to minimize the signal distortion, the timing controller 210 may set the dynamic scramble mode, and thereby, may generate a data packet and transmit the data packet to the source drive IC SDIC connected to each of the pixels positioned at both ends of the display panel 100. For example, the timing controller 210 may be connected to each source drive IC SDIC through two channels, and thus, may be connected to 16 source drive ICs SDIC through total 32 channels. As shown in FIG. 5, the timing controller 210 may set the dynamic scramble mode to generate data to be transmitted through four channels Out channel 1, Out channel 2, Out channel 31 and Out channel 32 between the source drive ICs SDIC positioned at both ends of the display panel 100 and the timing controller 210, and may not set the dynamic scramble mode to generate data to be transmitted through 28 channels Out channel 3 to Out channel 30 between the source drive ICs SDIC positioned at the center of the display panel 100 and the timing controller 210. Alternatively, the timing controller 210 may be connected to each source drive IC SDIC through one channel, and thus, may be connected to 16 source drive ICs SDIC through total 16 channels. As shown in FIG. 6, the timing controller 210 may set the dynamic scramble mode to generate data to be transmitted through two channels Out channel 1 and Out channel 16 between the source drive ICs SDIC positioned at both ends of the display panel 100 and the timing controller 210, and may not set the dynamic scramble mode to generate data to be transmitted through 14 channels Out channel 2 to Out channel 15 between the source drive ICs SDIC positioned at the center of the display panel 100 and the timing controller 210.

The host system converts the image data RGB into a format suitable for being displayed on the display panel 100. The host system transmits timing signals to the timing controller 210 together with data for an image. The host system is implemented as any one of a television system, a set-top box, a navigation system, a DVD player, a Blu-ray player, a personal computer (PC), a home theater system and a phone system, and thereby, receives an input image.

The host system may receive touch input coordinates from the touch controller 240, and may execute an application program related with the received touch input coordinates.

Referring back to FIG. 1, the gate driving circuit 220 generates a gate pulse (or a scan pulse) synchronized with a data signal under the control of the timing controller 210 during the display period, shifts the generated gate pulse, and supplies the shifted gate pulse sequentially to the gate lines G1 to Gm. To this end, the gate driving circuit 220 may include a plurality of gate drive ICs (not illustrated). The gate drive ICs sequentially supply the gate pulse synchronized with the data signal to the gate lines G1 to Gm under the control of the timing controller 210 during the display period to select a data line on which the data signal is to be written. The gate pulse swings between a gate high voltage VGH and a gate low voltage VGL.

During the touch sensing period TP, the gate driving circuit 220 may not generate the gate pulse and may supply the gate low voltage VGL to the gate lines G1 to Gm. Accordingly, the gate lines G1 to Gm supply the gate pulse to the thin film transistor of each of the pixels during the display period to sequentially select a data lines to which the data signal is to be written, in the display panel 100, and maintain the gate low voltage VGL during the touch sensing period to prevent the outputs of touch sensors from varying.

The data driving circuit 230 receives the data packet DataP from the timing controller 210 during the display period, and acquires the control data CFG, the image data RGB and the clock training data CT from the data packet DataP. The data packet DataP may be a packet of a form in which a clock is embedded between data.

The data driving circuit 230 converts the acquired image data RGB into an analog data signal and supplies the analog data signal to the pixels P through the plurality of data lines D1 to Dn.

To this end, as illustrated in FIG. 1, the data driving circuit 230 includes the plurality of source drive ICs SDIC. For example, as illustrated in FIG. 2, the data driving circuit 230 may include the total 16 source drive ICs SDIC #1 to SDIC #16. These source drive ICs SDIC #1 to SDIC #16 may be connected in a cascade manner, may be connected to the timing controller 210 in a point-to-point scheme through interface wiring pairs, and may each receive the data packet DataP from the controller 210.

In an embodiment, as illustrated in FIG. 7, each of the source drive ICs SDIC #1 to SDIC #i includes a digital data processing unit 710 and an analog data processing unit 720.

The digital data processing unit 710 receives the data packet DataP from the timing controller 210, analyzes the data packet DataP, latches image data in a predetermined unit according to a sampling signal, and then, converts the latched image data into an analog data signal. To this end, the digital data processing unit 710 includes a data receiver 712, a restoration circuit 714, a data sampler 716 and a digital-to-analog converter (DAC) 718.

The data receiver 712 receives the data packet DataP. In an embodiment, the data receiver 712 may be implemented by a reception buffer.

The restoration circuit 714 restores a clock to be used for data sampling, by using the clock training data CT included in the data packet DataP. When the restoration of the clock is completed, the restoration circuit 714 restores the control data CFG and the image data RGB from the data packet DataP on the basis of the restored clock.

According to an embodiment of the present disclosure, the restoration circuit 714 may include a descrambler to restore the image data RGB when the output data RGB' is scrambled image data.

In detail, when the high-level lock signal HIGH (see FIG. 2) is received from the timing controller 210 through the data receiver 712 or a high-level lock signal is received from another source drive IC SDIC through the data receiver 712, the restoration circuit 714 restores a clock to be used for data sampling, from the data packet DataP. When the phase and frequency of the restored clock are fixed and thus the clock is stabilized, the restoration circuit 714 outputs a high-level lock signal to the outside. At this time, when the source drive IC SDIC in which the restoration circuit 714 is included is the last source drive IC SDIC #i, the restoration circuit 714 transmits a high-level lock signal LOCK #i to the timing controller 210, and when the source drive IC SDIC in which the restoration circuit 714 is included is not a last source drive IC, the restoration circuit 714 outputs a high-level lock signal to another source drive IC SDIC.

When a low-level lock signal is received from the outside, the restoration circuit 714 outputs a low-level lock signal to the outside even though a clock restored by the restoration circuit 714 is stabilized. Accordingly, when a clock is not stabilized even in any one of the plurality of source drive ICs SDIC #1 to SDIC #i, since a low-level lock signal LOCK #i is finally outputted to the timing controller 210, the timing controller 210 transmits the data packet DataP including clock training data to the source drive ICs SDIC #1 to SDIC #i until clocks of all the source drive ICs SDIC #1 to SDIC #i are stabilized, and the respective source drive ICs SDIC #1 to SDIC #i resume clock training.

On the other hand, when the restoration of clocks is completed according to the clock training, the restoration circuit 714 restores the control data CFG and the image data RGB from the data packet DataP received through the data receiver 712, and transmits the restored control data CFG and image data RGB to the data sampler 716. According to an embodiment of the present disclosure, when the output data RGB' is scrambled image data, the restoration circuit 714 may restore the image data RGB by descrambling the output data RGB'.

In an embodiment, the control data CFG restored by the restoration circuit 714 may include at least one of a polarity control signal (POL), a source start pulse (SSP), a source sampling clock (SSC) and a source output enable signal (SOE).

The data sampler 716 generates a sampling clock on the basis of control data transmitted from the restoration circuit 714, sequentially latches digital image data corresponding to one horizontal line, provided from the restoration circuit 714 according to the sampling clock, and then, outputs the digital image data corresponding to one horizontal line, to the DAC 718. To this end, the data sampler 716 may include a shift register (not illustrated) which sequentially generates a sampling clock by shifting the source start pulse (SSP) according to the source sampling clock (SSC) among the control data, and a latch (not illustrated) which sequentially latches image data according to the sampling clock.

The DAC 718 converts digital image data outputted through the data sampler 716 into a positive analog data signal or a negative analog data signal in response to the polarity control signal (POL), and transfers the converted positive analog data signal or negative analog data signal to the analog data processing unit 720.

The analog data processing unit 720 outputs the analog data signal, generated by the digital data processing unit 710, to the display panel 100. In an embodiment, the analog data processing unit 720 may include an output buffer 722. The output buffer 722 outputs a data signal to the data lines D1 to Dn during a period in which the source output enable signal (SOE) is at a low level, and supplies a charge share voltage or a common voltage (Vcom) to the data lines D1 to Dn during a period in which the source output enable signal (SOE) is at a high level.

Referring back to FIG. 1, the touch driving circuit 250 acquires touch sensing data from the touch sensors TE, by driving the touch sensors TE during the touch sensing period TP. To this end, the touch driving circuit 250 may include a plurality of readout ICs ROIC.

In an embodiment, when the display panel 100 is implemented in a mutual capacitance type, the readout IC ROIC may include a driving circuit which generates a touch driving signal for driving the touch sensor TE and supplies the touch driving signal to each of the touch sensors TE through each of the touch lines T1 to Tk, and a sensing circuit which senses the capacitance change of each of the touch sensors TE through each of the touch lines T1 to Tk and generates a touch sensing signal (touch raw data).

In another embodiment, when the display panel 100 is implemented in a self capacitance type, the readout IC ROIC may supply a touch driving signal to each of the touch sensors TE and acquire a touch sensing signal from each of the touch sensors TE, by using one circuit.

The readout IC ROIC supplies a common voltage to each of the touch sensors TE through each of the touch lines T1 to Tk during the display period. Accordingly, each of the touch sensors TE performs the function of a common electrode during the display period.

In the above-described embodiment, it is illustrated that the source drive IC SDIC and the readout IC ROIC are implemented as separate components. However, in another embodiment, the source drive IC SDIC and the readout IC ROIC may be implemented in a form in which they are integrated into one chip SRIC.

The touch controller 240 may analyze touch sensing data received from the readout IC ROIC with a preset touch recognition algorithm, may determine touch sensing data equal to or higher than a predetermined threshold voltage, as touch input data, and may calculate the coordinate values of a touch input position. The coordinate information of the touch input position outputted from the touch controller 240 is transmitted to the external host system.

Hereinafter, a method for driving a timing controller in accordance with an embodiment of the present disclosure will be described in detail with reference to FIGS. 8 to 10.

Figure 8:
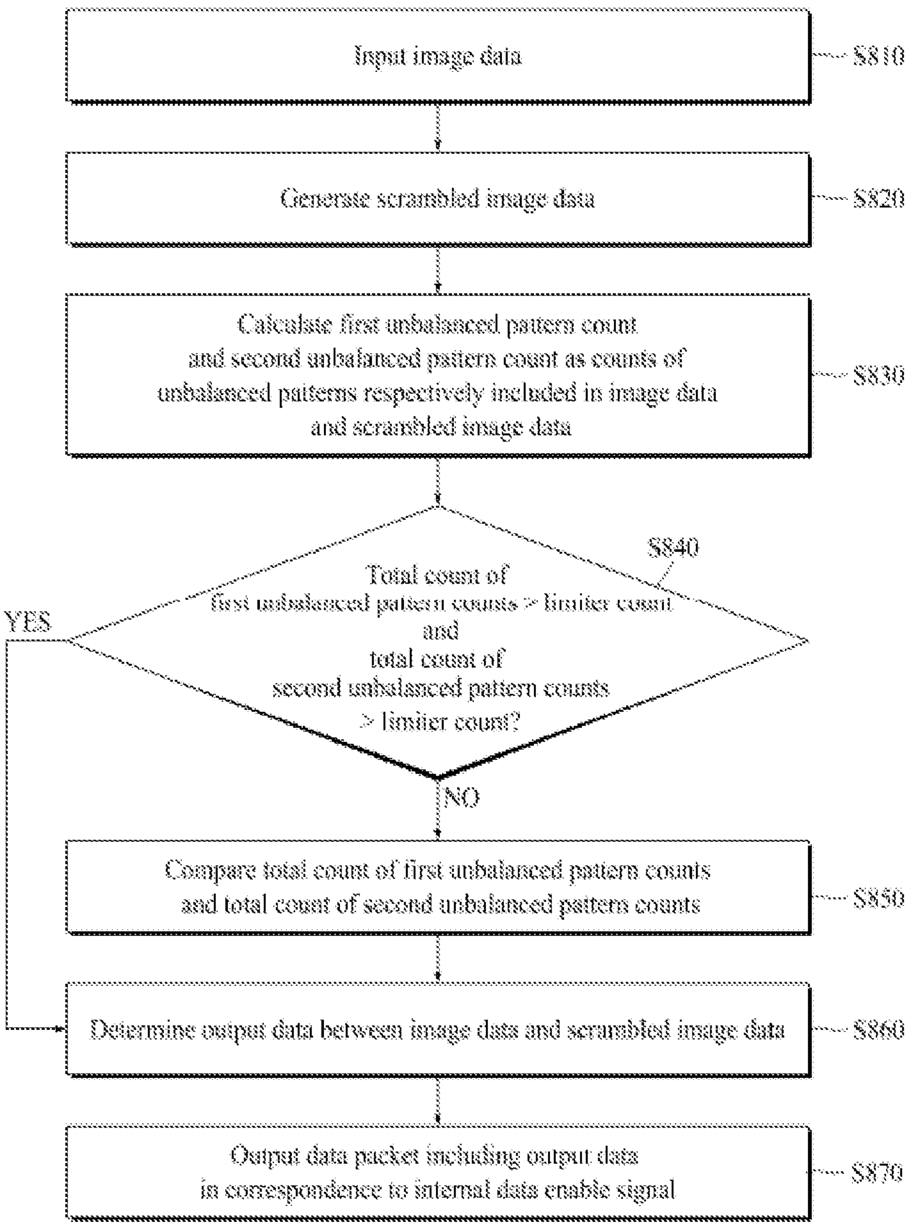
FIG. 8 is a flowchart illustrating a method for driving a timing controller in accordance with an embodiment of the present disclosure.

FIG. 8 is a flowchart illustrating a method for driving a timing controller in accordance with an embodiment of the present disclosure. FIG. 9 is a diagram illustrating a pattern detection method in accordance with an embodiment of the present disclosure. FIG. 10 is a diagram illustrating a method for calculating the total count of the first unbalanced pattern counts and the total count of the second unbalanced pattern counts for each frame data and determining whether to perform dynamic scramble.

As described above, the timing controller 210 in accordance with the embodiment of the present disclosure may transmit data, generated by the dynamic scramble mode, to at least one source drive IC SDIC. In detail, the timing controller 210 may transmit data, generated by the dynamic scramble mode, through at least one of channels which connect the timing controller 210 and the source drive IC SDIC.

A process in which a data packet is generated by the dynamic scramble mode according to the embodiment of the present disclosure and is then transmitted will be described in detail with reference to FIGS. 8 to 10.

The image data RGB is inputted to the timing controller 210 from the outside (S810).

The scrambler 211 generates the scrambled image data SRGB by randomizing (scrambling) the inputted image data RGB (S820).

Although not illustrated, as the clock data CK and the dummy data Dummy are added to the image data RGB and scrambled image data SRGB, the horizontal line data HLD, which is data for one horizontal line, may be generated. For example, each horizontal line data HLD may be configured by the clock data CK, the image data RGB or the scrambled image data SRGB and the dummy data Dummy. The clock data CK, the image data RGB or the scrambled image data SRGB and the dummy data Dummy may be sequentially configured. As shown in FIG. 9, the horizontal line data HLD may be configured by 2-bit clock data CK, 20-bit image data RGB or scrambled image data SRGB and 2-bit dummy data Dummy, and thus, may be configured by total 24-bit data.

The pattern detection unit 213 calculates the first unbalanced pattern count UP1 being the count of unbalanced patterns included in the image data RGB and the second unbalanced pattern count UP2 being the count of unbalanced patterns included in the scrambled image data SRGB (S830). An unbalanced pattern may include a signal with a high distortion frequency such as a signal in which the same value is continued and is then inverted and re-inverted. For example, "1111010" may be an unbalanced pattern. As shown in FIG. 9, the pattern detection unit 213 may calculate the count of the unbalanced patterns "1111010" included in each of the image data RGB and the scrambled image data SRGB to each of which the clock data CK and the dummy data Dummy are added. The pattern detection unit 213 may calculate the first unbalanced pattern count UP1 as 1 and the second unbalanced pattern count UP2 as 1 for the image data RGB and the scrambled image data SRGB of a first table of FIG. 9, may calculate the first unbalanced pattern count UP1 as 1 and the second unbalanced pattern count UP2 as 0 for the image data RGB and the scrambled image data SRGB of a second table of FIG. 9, may calculate the first unbalanced pattern count UP1 as 0 and the second unbalanced pattern count UP2 as 1 for the image data RGB and the scrambled image data SRGB of a third table of FIG. 9, may calculate the first unbalanced pattern count UP1 as 0 and the second unbalanced pattern count UP2 as 0 for the image data RGB and the scrambled image data SRGB of a fourth table of FIG. 9, and may calculate the first unbalanced pattern count UP1 as 1 and the second unbalanced pattern count UP2 as 2 for the image data RGB and the scrambled image data SRGB of a fifth table of FIG. 9. As shown in FIG. 10, the pattern detection unit 213 may calculate the first unbalanced pattern count UP1 or the second unbalanced pattern count UP2 for each of a plurality of image data RGB or a plurality of scrambled image data SRGB included in one frame data, and may calculate the total count of the first unbalanced pattern counts UP1 and the total count of the second unbalanced pattern counts UP2 for one frame data.

The output data determination unit 214 compares the total count of the first unbalanced pattern counts UP1 for one frame data and the total count of the second unbalanced pattern counts UP2 for one frame data with a limiter count (S840). In detail, the total count of a plurality of first unbalanced pattern counts UP1 for the image data RGB included in one frame data is compared with the limiter count "10," and the total count of a plurality of second unbalanced pattern counts UP2 for the scrambled image data SRGB included in one frame data is compared with the limiter count "10."

As a result of comparing the total count of the first unbalanced pattern counts UP1 for one frame data and the total count of the second unbalanced pattern counts UP2 for one frame data with the limiter count, when the total count of the first unbalanced pattern counts UP1 is less than or equal to the limiter count or when the total count of the second unbalanced pattern counts UP2 is less than or equal to the limiter count, the output data determination unit 214 compares the total count of the first unbalanced pattern counts UP1 and the total count of the second unbalanced pattern counts UP2 (S850).

The output data determination unit 214 determines any one of the image data RGB and the scrambled image data SRGB as the output data RGB' (S860).

When both the total count of the first unbalanced pattern counts UP1 for one frame data and the total count of the second unbalanced pattern counts UP2 for one frame data are greater than the limiter count "10," the output data determination unit 214 constantly determines, regardless of the total count of the first unbalanced pattern counts UP1 for one frame data and the total count of the second unbalanced pattern counts UP2 for one frame data, any one of the image data RGB and the scrambled image data SRGB as the output data RGB'. For example, when, as shown in a first table of FIG. 10, the total count of the first unbalanced pattern counts UP1 for one frame data is 13 and the total count of the second unbalanced pattern counts UP2 for one frame data is 12 or when, as shown in a second table of FIG. 10, the total count of the first unbalanced pattern counts UP1 for one frame data is 12 and the total count of the second unbalanced pattern counts UP2 for one frame data is 13, because, in both cases, each of the total count of the first unbalanced pattern counts UP1 for one frame data and the total count of the second unbalanced pattern counts UP2 for one frame data is greater than the limiter count "10," the output data determination unit 214 may determine, regardless of the total count of the first unbalanced pattern counts UP1 for one frame data and the total count of the second unbalanced pattern counts UP2 for one frame data, the scrambled image data SRGB as the output data RGB'.

On the other hand, when the total count of the first unbalanced pattern counts UP1 for one frame data is less than or equal to the limiter count or when the total count of the second unbalanced pattern counts UP2 for one frame data is less than or equal to the limiter count, the output data determination unit 214 determines the output data RGB' by using a result of comparing the total count of the first unbalanced pattern counts UP1 and the total count of the second unbalanced pattern counts UP2 at the step S850. That is to say, when the total count of the first unbalanced pattern counts UP1 for one frame data is less than or equal to the limiter count or when the total count of the second unbalanced pattern counts UP2 for one frame data is less than or equal to the limiter count, the output data determination unit 214 determines data including a smaller count of unbalanced patterns as the output data RGB'. For example, as shown in a third table of FIG. 10, when the total count of the first unbalanced pattern counts UP1 for one frame data is 4 and the total count of the second unbalanced pattern counts UP2 for one frame data is 6, because the total count of the first unbalanced pattern counts UP1 for one frame data is less than the total count of the second unbalanced pattern counts UP2 for one frame data, the output data determination unit 214 may determine the image data RGB as the output data RGB'. In other words, since the total count of the unbalanced patterns included in the image data RGB for one frame data is less than the total count of the unbalanced patterns included in the scrambled image data SRGB for one frame data, the output data determination unit 214 may determine the image data RGB as the output data RGB'.

On the other hand, as shown in a fourth table of FIG. 10, when the total count of the first unbalanced pattern counts UP1 for one frame data is 8 and the total count of the second unbalanced pattern counts UP2 for one frame data is 6, because the total count of the second unbalanced pattern counts UP2 for one frame data is less than the total count of the first unbalanced pattern counts UP1 for one frame data, the output data determination unit 214 may determine the scrambled image data SRGB as the output data RGB'. In other words, since the total count of the unbalanced patterns included in the scrambled image data SRGB for one frame data is less than the total count of the unbalanced patterns included in the image data RGB for one frame data, the output data determination unit 214 may determine the scrambled image data SRGB as the output data RGB'.

The data output unit 218 outputs a data packet including the determined output data RGB', in response to the internal data enable signal iDE (S870). In detail, as described above, the data output unit 218 generates and outputs the data packet configured by the control data CFG, the output data RGB' and the clock training data CT in synchronization with the internal data enable signal iDE generated using the vertical synchronization signal Vsync and the data enable signal DE.

What is claimed is:

1. A timing controller suitable for receiving image data and a timing signal from a host system and outputting output data to a data driving circuit, comprising:
- a scrambler configured to output scrambled image data by scrambling the image data;
- a pattern detection unit configured to calculate a first unbalanced pattern count as a count of unbalanced patterns included in the image data and a second unbalanced pattern count as a count of unbalanced patterns included in the scrambled image data; and
- an output data determination unit configured to determine output data by using the first unbalanced pattern count and the second unbalanced pattern count.

2. The timing controller according to claim 1, wherein the output data determination unit determines output data by using a total count of the first unbalanced pattern counts for one frame and a total count of the second unbalanced pattern counts for one frame.

3. The timing controller according to claim 1, wherein the output data determination unit determines the output data by comparing a total count of the first unbalanced pattern counts for one frame and a total count of the second unbalanced pattern counts for the one frame with a limiter count respectively.

4. The timing controller according to claim 3, wherein
- when the total count of the first unbalanced pattern counts is greater than the limiter count and the total count of the second unbalanced pattern counts is greater than the limiter count, the output data determination unit outputs one of the image data and the scrambled image data, and
- when the total count of the first unbalanced pattern counts is less than or equal to the limiter count or when the total count of the second unbalanced pattern counts is less than or equal to the limiter count, the output data determination unit determines output data by comparing the total count of the first unbalanced pattern counts and the total count of the second unbalanced pattern counts.

5. The timing controller according to claim 4, wherein
- when the total count of the first unbalanced pattern counts is less than the total count of the second unbalanced pattern counts, the output data determination unit determines the image data as output data, and
- when the total count of the second unbalanced pattern counts is less than the total count of the first unbalanced pattern counts, the output data determination unit determines the scrambled image data as output data.

6. The timing controller according to claim 1, wherein
- when a dynamic scramble mode is set, the output data determination unit determines one of the image data and the scrambled image data as output data according to the first unbalanced pattern count and the second unbalanced pattern count, and
- when the dynamic scramble mode is not set, the output data determination unit determines one of the image data and the scrambled image data as output data.

7. The timing controller according to claim 1, wherein
- the first unbalanced pattern count is a count of unbalanced patterns included in each horizontal line data for one frame, and the second unbalanced pattern count is a count of unbalanced patterns included in each horizontal line data for one frame.

8. The timing controller according to claim 1, wherein an internal data enable signal is generated using the timing signal, and wherein the timing controller further comprises:

a data output unit configured to transmit a data packet configured by control data, the output data and clock training data, in synchronization with the internal data enable signal.

9. A display driving device suitable for receiving image data and a timing signal from a host system and providing a data signal for outputting an image to a display panel, comprising:

a pattern detection unit configured to calculate a first unbalanced pattern count as a count of unbalanced patterns included in the image data and a second unbalanced pattern count as a count of unbalanced patterns included in scrambled image data as data obtained by scrambling the image data; and an output data determination unit configured to determine output data by using the first unbalanced pattern count and the second unbalanced pattern count.

10. The display driving device according to claim 9, wherein the output data determination unit determines the output data by comparing a total count of the first unbalanced pattern counts for one frame and a total count of the second unbalanced pattern counts for the one frame with a limiter count.

11. The display driving device according to claim 10, wherein when the total count of the first unbalanced pattern counts is greater than the limiter count and the total count of the second unbalanced pattern counts is greater than the limiter count, the output data determination unit outputs one of the image data and the scrambled image data, and when the total count of the first unbalanced pattern counts is less than or equal to the limiter count or when the total count of the second unbalanced pattern counts is less than or equal to the limiter count, the output data determination unit determines output data by comparing the total count of the first unbalanced pattern counts and the total count of the second unbalanced pattern counts.

12. The display driving device according to claim 11, wherein when the total count of the first unbalanced pattern counts is less than the total count of the second unbalanced pattern counts, the output data determination unit determines the image data as output data, and when the total count of the second unbalanced pattern counts is less than the total count of the first unbalanced pattern counts, the output data determination unit determines the scrambled image data as output data.

13. The display driving device according to claim 9, wherein when a dynamic scramble mode is set, the output data determination unit determines one of the image data and the scrambled image data as output data according to the first unbalanced pattern count and the second unbalanced pattern count, and when the dynamic scramble mode is not set, the output data determination unit determines one of the image data and the scrambled image data as output data.

14. The display driving device according to claim 9, wherein the first unbalanced pattern count is a count of unbalanced patterns included in each horizontal line data for one frame, and the second unbalanced pattern count is a count of unbalanced patterns included in each horizontal line data for one frame.

15. A method for driving a timing controller suitable for receiving image data and a timing signal from a host system and outputting output data to a data driving circuit, the method comprising:

receiving the image data;

generating scrambled image data by scrambling the image data;

calculating a first unbalanced pattern count as a count of unbalanced patterns included in the image data and a second unbalanced pattern count as a count of unbalanced patterns included in the scrambled image data; and determining output data by using the first unbalanced pattern count and the second unbalanced pattern count.

16. The method according to claim 15, wherein in the determining of the output data, the output data is determined by using a total count of the first unbalanced pattern counts for one frame and a total count of the second unbalanced pattern counts for one frame.

17. The method according to claim 15, wherein the determining of the output data comprises:

comparing a total count of the first unbalanced pattern counts for one frame and a total count of the second unbalanced pattern counts for the one frame with a limiter count;

outputting, when the total count of the first unbalanced pattern counts is greater than the limiter count and the total count of the second unbalanced pattern counts is greater than the limiter count, one of the image data and the scrambled image data; and determining, when the total count of the first unbalanced pattern counts is less than or equal to the limiter count or when the total count of the second unbalanced pattern counts is less than or equal to the limiter count, output data by comparing the total count of the first unbalanced pattern counts and the total count of the second unbalanced pattern counts.

18. The method according to claim 17, wherein the determining of the output data by comparing the total count of the first unbalanced pattern counts and the total count of the second unbalanced pattern counts comprises:

when the total count of the first unbalanced pattern counts is less than or equal to the limiter count or when the total count of the second unbalanced pattern counts is less than or equal to the limiter count, determining the image data as the output data if the total count of the first unbalanced pattern counts is less than the total count of the second unbalanced pattern counts; and when the total count of the first unbalanced pattern counts is less than or equal to the limiter count or when the total count of the second unbalanced pattern counts is less than or equal to the limiter count, determining the scrambled image data as the output data if the total count of the second unbalanced pattern counts is less than the total count of the first unbalanced pattern counts.

* * * * *